(12) United States Patent
Fox et al.

(10) Patent No.: US 9,131,007 B2
(45) Date of Patent: Sep. 8, 2015

(54) SYSTEM AND METHOD FOR DYNAMICALLY TRANSCODING DATA REQUESTS

(75) Inventors: Brian J Fox, Santa Barbara, CA (US); Alexander S Guy, Santa Barbara, CA (US)

(73) Assignee: Vitrual World Computing, Inc., Santa Barbara, CA (US)

( * ) Notice: Subject to any disclaimer, the term of this patent is extended or adjusted under 35 U.S.C. 154(b) by 397 days.

(21) Appl. No.: 12/783,456

(22) Filed: May 19, 2010

(65) Prior Publication Data

US 2010/0299453 A1 Nov. 25, 2010

Related U.S. Application Data

(60) Provisional application No. 61/179,648, filed on May 19, 2009.

(51) Int. Cl.
| | |
|---|---|
| *H04L 29/08* | (2006.01) |
| *G06Q 30/06* | (2012.01) |
| *H04L 29/06* | (2006.01) |
| *H04N 19/61* | (2014.01) |
| *H04N 19/40* | (2014.01) |
| *H04N 19/164* | (2014.01) |

(52) U.S. Cl.
CPC ........ *H04L 67/2828* (2013.01); *G06Q 30/0613* (2013.01); *H04L 69/14* (2013.01); *H04L 63/0281* (2013.01); *H04L 65/104* (2013.01); *H04L 69/04* (2013.01); *H04N 19/164* (2014.11); *H04N 19/40* (2014.11); *H04N 19/61* (2014.11)

(58) Field of Classification Search
None
See application file for complete search history.

(56) References Cited

U.S. PATENT DOCUMENTS

| | | | | |
|---|---|---|---|---|
| 5,689,800 | A * | 11/1997 | Downs | 725/114 |
| 6,101,328 | A * | 8/2000 | Bakshi et al. | 717/170 |
| 6,247,048 | B1 * | 6/2001 | Greer et al. | 709/219 |
| 6,490,320 | B1 * | 12/2002 | Vetro et al. | 375/240.08 |
| 6,542,546 | B1 * | 4/2003 | Vetro et al. | 375/240.12 |
| 6,894,973 | B1 * | 5/2005 | Mishra | 370/229 |
| 6,898,241 | B2 * | 5/2005 | Vetro | 375/240.12 |
| 7,266,611 | B2 * | 9/2007 | Jabri et al. | 709/231 |
| 7,376,629 | B1 | 5/2008 | McIsaac | |
| 7,409,093 | B2 * | 8/2008 | Ju | 382/232 |
| 7,590,759 | B2 * | 9/2009 | Omar et al. | 709/246 |
| 7,643,422 | B1 * | 1/2010 | Covell et al. | 370/235 |
| 7,971,261 | B2 * | 6/2011 | Pestoni | 726/27 |
| 8,145,001 | B2 * | 3/2012 | Khorasani et al. | 382/232 |
| 2001/0037355 | A1 * | 11/2001 | Britt, Jr. | 709/201 |
| 2002/0049833 | A1 * | 4/2002 | Kikinis | 709/219 |
| 2002/0102998 | A1 * | 8/2002 | Lin | 455/466 |
| 2002/0112244 | A1 * | 8/2002 | Liou et al. | 725/93 |
| 2003/0043908 | A1 * | 3/2003 | Gao | 375/240.12 |
| 2004/0199665 | A1 * | 10/2004 | Omar et al. | 709/238 |
| 2006/0013235 | A1 * | 1/2006 | Farnham | 370/401 |
| 2006/0018378 | A1 * | 1/2006 | Piccinelli et al. | 375/240.03 |
| 2006/0101160 | A1 * | 5/2006 | Coulombe | 709/246 |

(Continued)

FOREIGN PATENT DOCUMENTS

WO 2009079708 2/2009

*Primary Examiner* — Backhean Tiv
(74) *Attorney, Agent, or Firm* — Lathrop & Gage LLP

(57) ABSTRACT

A communications method and system which can accommodate changes in various parameters on a dynamic basis. A communications method and system utilizing a proxy for delivery of content at an optimal level to a client, even in the face of constantly changing client, channel conditions, or content parameters.

9 Claims, 3 Drawing Sheets

(56) References Cited

U.S. PATENT DOCUMENTS

| | | | |
|---|---|---|---|
| 2006/0160543 A1* | 7/2006 | Mashinsky | 455/452.2 |
| 2007/0053427 A1* | 3/2007 | Henocq | 375/240 |
| 2007/0083617 A1* | 4/2007 | Chakrabarti et al. | 709/218 |
| 2007/0236599 A1* | 10/2007 | van Beek | 348/419.1 |
| 2007/0297507 A1* | 12/2007 | Kim | 375/240.03 |
| 2008/0313264 A1* | 12/2008 | Pestoni | 709/202 |
| 2009/0080854 A1* | 3/2009 | Arai | 386/52 |
| 2009/0131014 A1* | 5/2009 | Mashinsky et al. | 455/405 |
| 2009/0296657 A1* | 12/2009 | Omar et al. | 370/331 |
| 2009/0300205 A1* | 12/2009 | Jabri | 709/231 |
| 2010/0008421 A1* | 1/2010 | Gutman et al. | 375/240.16 |
| 2010/0080476 A1* | 4/2010 | Khorasani et al. | 382/235 |
| 2010/0189063 A1* | 7/2010 | Kokku et al. | 370/329 |
| 2010/0299453 A1* | 11/2010 | Fox et al. | 709/246 |
| 2011/0110335 A1* | 5/2011 | Weniger et al. | 370/331 |
| 2012/0004960 A1* | 1/2012 | Ma et al. | 705/14.4 |

* cited by examiner

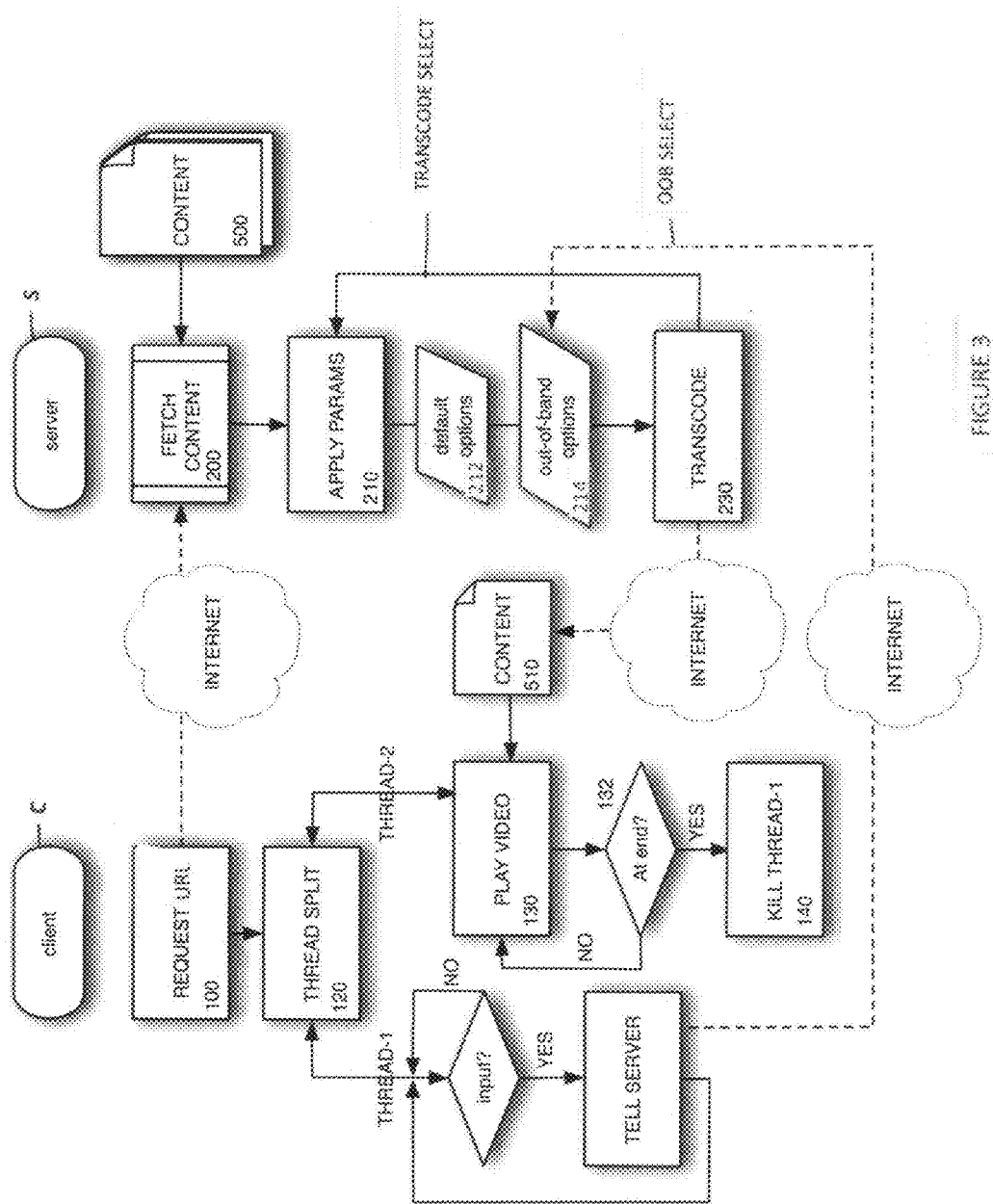

SYSTEM AND METHOD FOR DYNAMICALLY TRANSCODING DATA REQUESTS

REFERENCE TO RELATED APPLICATION

This application claims priority to U.S. Provisional Patent Application Ser. No. 61/179,648, filed May 19, 2009, entitled SYSTEM AND METHOD FOR DYNAMICALLY TRANSCODING DATA REQUESTS. That application is incorporated herein by reference.

FIELD

This invention is in the field of-device communication, and more particularly where such communication is performed over a network.

BACKGROUND

There are an increasing number of networks over which various digital devices communicate with each other. If all such devices operated with the same hardware and software, this inter-device communication would be relatively easy. However, that is not generally the case, and it is often necessary to convert, or transcode, signals passing between communicating devices so that the respective devices can receive and properly interpret the signals.

Transcoding is the direct digital-to-digital conversion of data from one encoding to another. Typically, it is used for the conversion of rich media (such as audio and video) from a format incompatible with a specific application into a format that can be directly utilized by that application. It may also be used to transform HTML and graphics to more closely match the constraints of mobile devices. The type of transcoding that is referenced in the system of the present invention is that which utilizes a proxy server or device, which sits between a requesting client application and an internet location providing the data. A proxy server transcodes the data from its original format into a format which is optimized for delivery to, and use by, a target client.

The transcoding process is static, in that the source and target formats are predetermined, and the transcoding is performed without any additional inputs. NetFlix and YouTube are examples of systems that use static transcoding, setting up transcoding parameters before a session. Those parameters cannot be changed during a session.

Prior art systems exist to implement a client-defined filter between the client and the content, e.g., parental control filters and the like. One such example is the Google "Safe Search" system, which permits the user to request that certain content not be transmitted. This is a static system requiring the user to predefine the parameters of the filter prior to content retrieval.

Other prior art systems include filters that change certain client-defined words prior to delivery, e.g., changing an offensive word into a predefined substitute word. This type of filter also relies upon static, predefined rules.

Transcoding utilizing only predefined rules does not allow for dynamic optimization of the delivery of the transcoded content, nor does it allow for dynamic modification of the content. Thus, fluctuating changes in network bandwidth at the client are not part of the process of transcoding as represented by the prior art.

The limitation imposed by static transcoding is problematic. There are many situations where changes in a parameter will affect inefficient inter-device communication over a network. For example, if the bandwidth of one of the communicating devices were to change mid-session, then static transcoding-based inefficiencies would occur. For example if the sender were to suffer a reduction in bandwidth during a session, yet the channel bandwidth were to remain constant, then the efficiency over the channel would be reduced. On the other hand if the receiver were to suffer a reduction in bandwidth during a session, then while the data rate over the channel might remain the same for the sender, the receiver would not be able to receive all of the transmitted data. Numerous other examples exist.

In view of the problems posed by static transcoding, there is a need for communications to be adaptive to changing parameters during a communication session.

SUMMARY

The invention provides a communications method and system which can accommodate changes in various parameters on a dynamic basis. The invention further provides a communications method and system utilizing a proxy for delivery of content at an optimal level to a client, even in the face of constantly changing client or channel conditions. In accordance with the invention, changes in network bandwidth at a client may be accommodated using out-of-band (OOB) communication with a transcoder, for example, effecting an adaptive compression algorithm to be utilized, amidst and without interruption, of the content delivery.

In various forms, the invention provides a system and method for utilizing out-of-band and dynamically delivered information to effect transcoding of data based on the characteristics of the content as well as client-determined criteria and behaviors. Thus, in one embodiment of the present inventive system, the client may redefine the parameters for delivering content based upon the nature of the content after the initial request has been sent from the client to the transcoding engine. Alternatively, an operator or determinant other than the client may set optimization or other parameters for the delivery of certain content from the content source to the client after the client request has been sent, based upon the nature of the request, the client, the nature of the content, and the like. Specifically, the content itself can be utilized as dynamic parameters to the transcoding process.

The present system delivers coded content from a content server to a client, and includes at least a client, a proxy server, a content server, and a transcoder. In an embodiment, the client is adapted to generate and transfer a content request to the proxy server, which includes content deliverable by the content server. The deliverable content is encoded in accordance with a first coding scheme. In an embodiment, the proxy server is responsive to the content request to effect transfer of the requested deliverable content from the content server to the transcoder. The transcoder is responsive to the transferred deliverable content. In an embodiment, the transcoder: (i) transcodes the deliverable content to a transcoding content, in accordance with a transcoding process, whereby the transcoded content is encoded in accordance with a second coding scheme; and (ii) transmits the transcoded content to the client. The transcoding process is dynamically defined during the delivery of the coded content from the content server to the client, in response to an applied out-of-band transcoding process control signal.

In one embodiment, the client is adapted to generate the transcoding process control signal. In an embodiment, the transcoding process control signal is generated in response to communication parameters associated with signal paths between two or more of the client, proxy server and content server. In yet another embodiment, the transcoding process control signal is generated in response to detected content of the requested content.

In an embodiment, the proxy server is adapted to generate the transcoding process control signal. In another embodiment, the transcoding process control signal is generated in response to communication parameters associated with signal paths between two or more of the client, proxy server and content server. The control signal can be generated in response to detected content of the requested content. In an embodiment, the content server is adapted to generate the control signal. The transcoding process control signal can be generated in response to communication parameters associated with signal paths between two or more of the client, proxy server and content server. In an embodiment, the transcoding process control signal is generated in response to detected content of the requested content.

BRIEF DESCRIPTION OF THE DRAWINGS

FIG. 3 sets forth a detailed view of a flow chart of a dynamic transcoding process.

DETAILED DESCRIPTION

Figure 1:
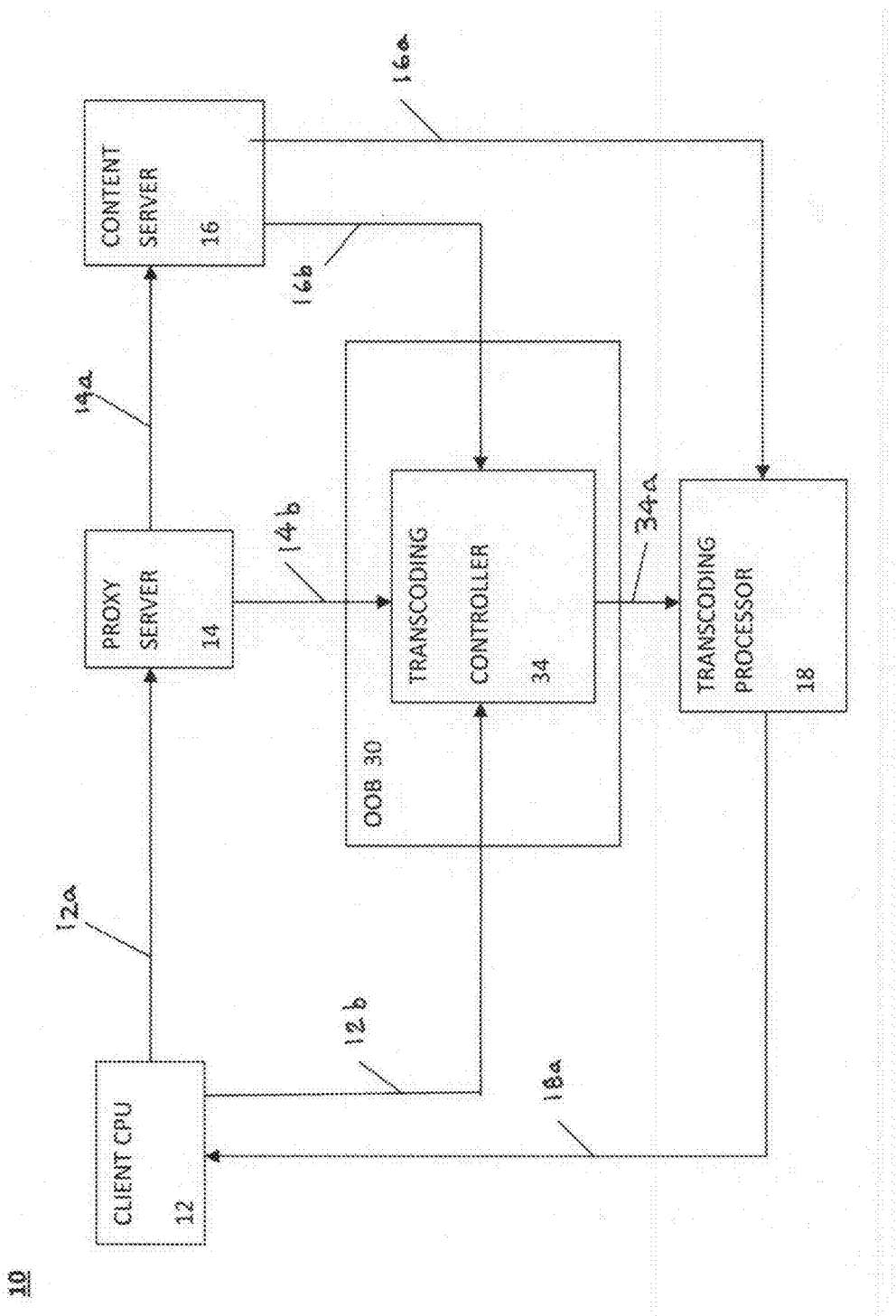
FIG. 1 shows an exemplary embodiment of the invention in block diagram form.

An exemplary system 10 in accordance with the invention is shown in FIG. 1. System 10 includes a client 12, a proxy server 14, content server 16, and a transcoding processor 18. An out-of-band (OOB) network 30 includes a transcoding controller 34. The client 12 is coupled to proxy server 14 by way of signal path 12a. The proxy server 14 is coupled to content server 16 way of signal path 14a. The content server 16 is coupled to transcoding processor 18 by way of signal path 16a. The transcoding processor 18 is coupled to client 12 by way of signal path 18a. The client 12 and proxy server 14 are coupled to the transcoding controller 34 by signal paths 12b and 14b, respectively. Transcoding controller 34 is coupled to transcoding processor 18 by signal path 30a.

In operation, client 12 sends a request-for-content signal to proxy server 14 via signal path 12a. In response, proxy server 14 forwards a content request signal to content server 16 via signal path 14a. Content server 16 in turn forwards the requested content to transcoding processor 18 via signal path 16a. In this example, the content requested by the client 12 might be a content container, such as a webpage.

The transcoding processor 18 is adapted to receive the encoded content signal from content server 16, and transcode that signal, and then forward the transcoded signal to client 12 by way of signal path 18a.

A transcoding process is performed by the transcoding processor 18, where that process is determined by a signal applied thereto via signal path 34a from transcoding controller 34. In the illustrated embodiment, the transcoding controller 34 is operative in an optional first state, to control transcoding processor 18 to operate in a static mode, transcoding the signal from signal path 16a in accordance with a pre-determined (or default) static set of rules, regardless of ambient conditions or other parameters affecting the communication link between client 12 and content server 16. The transcoding controller 34 is operative in a second state, in response to an out-of-band signal on signal path 12b from client 12, to dynamically change the transcoding process effected by transcoding processor 18, at any time during the communication link or session between client 12 and content server 16. Again, in the illustrated embodiment, the transcoding controller 34 is operative in a third state, in response to an out-of-band signal on signal path 14b from proxy server 14, to dynamically change the transcoding process effected by transcoding processor 18, at any time during the communication link or session between client 12 and content server 16.

In alternative embodiments, a third signal path 16b, may provide an out-of-band signal from content server 16 to dynamically change the transcoding process effected by transcoding processor 18, at any time during the communication link or session between client 12 and content server 16. Any or all of signal paths 12b, 14b, and 16b may be used in various forms of system 100.

Thus, in the illustrated embodiment, either of client 12 or proxy server 14 (or content server 16) may, in response to sense conditions, dynamically change the transcoding process which is applied to the content signal delivered from content server 16 by way of transcoding processor 18, to client 12.

In other embodiments, the dynamic control of transcoding processor 18 can be effected by only client 12 or only by proxy server 14, or only by content server 16, or some other third party which has the responsibility for detecting parameters associated with the communication link between client 12 and content server 16, and responding thereto by generating an appropriate signal to the transcoding controller so that a dynamic transcoding process is performed by transcoding processor 18.

In a preferred form, proxy server 14 acts to insulate client 12 from direct contact/communication with third parties, such as content server 16. This insulation might be accomplished using the Cocoon™ Internet services available from Virtual World Computing LLC, Santa Barbara, Calif. (www.virtualworldcomputing.com).

While the above-illustrated embodiment of the invention is described for, and shown in FIG. 1, as elements which are directly connected by the respective signal paths, the invention may be readily configured over a network, such as the Internet, wherein each of the respective elements are coupled to each other by way of the Internet. Alternatively, it may be configured with other network configurations.

Figure 2:
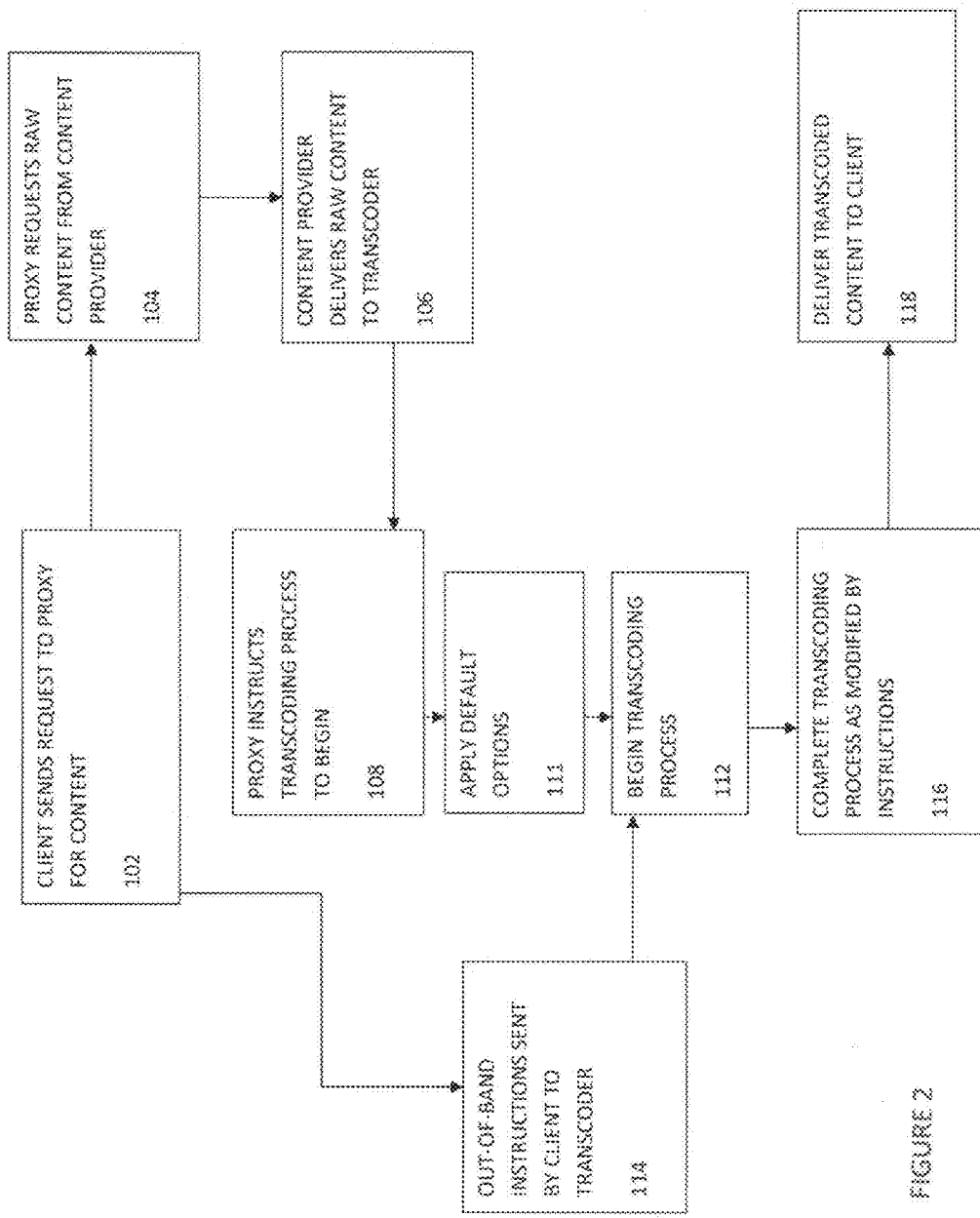
FIG. 2 sets forth a broad view of a flow chart of a dynamic transcoding process.

FIG. 2 is a flow chart of an embodiment of the method for dynamic transcoding in accordance with the invention. In practicing the inventive method, a client may send a request 102 for a content container (such as a web page) from a proxy, such as a proxy server. The proxy sends a request 104 for the client-requested raw content to a content provider, such as the Internet. The content provider delivers raw content to a transcoder device 106 for transcoding prior to delivery to the client. The proxy sends instructions 108 to a transcoder device to begin transcoding 112 the raw content using pre-computed and default options. The transcoding process, at least initially, implements default options 111 that may be transmitted by the proxy either simultaneously with its process instruction 108 or subsequent, or which may otherwise be embedded in the transcoder. The transcoding process may be affected and/or potentially modified by client out-of-band input 114. This out-of-band input may be generated without intervention by the end-user (e.g., bandwidth capability changes, physical location of the client), or specifically generated by the end-user (e.g., change playback speed, reduce video resolution). The transcoding process is completed 116 utilizing the various inputs to dynamically change the output stream back to the client 118. Typically, the transcoded content resulting from the transcoding process is delivered directly to the client 116. However, it is possible to have the content delivered to the proxy for additional processing prior to delivery to the client.

The transcoding process may receive inputs from the client, the proxy, and even from the content system itself. For example, a content system could notify the transcoding process that a higher resolution video stream has just become available. In that case, if the client has sufficient bandwidth to receive richer data, the transcoding process could deliver the content at a higher bit rate.

FIG. 3 illustrates a detailed flow chart for a method for dynamic transcoding. A client C may send a request (step 100) by way of the Internet, for a content container (such as a webpage, URL) from a proxy, such as a proxy server S. The proxy S effects a batch content request (step 200) for the client-requested raw content to a content provider, such as a server on the Internet. The content provider delivers the raw content (step 500) to a transcoder for transcoding prior to delivery to the client C. The proxy effects transcoding parameters and instructions (step 210) resulting in a transcoder device beginning transcoding (step 230) the raw content using pre-computed and default options. The transcoding process (step 230) may be effected and/or modified (step 214) by an out-of-band client-originated option, or may be generated (step 210) by transcoding select without intervention by the end-user, client C (e.g., bandwidth capability changes, physical location of the client), or specifically generated by the end-user client C (e.g., change playback speed, reduce video resolution). The transcoding process (step 230) is effected utilizing the various inputs to dynamically change the output stream, and deliver it to the client C (step 510). Typically, the transcoded content resulting from the transcoding process is delivered directly to the client C, and where it is video, for example, the video is played (step 130) until the video reaches the end (step 132). However, it is possible to have content delivered to the proxy for additional processing prior to delivery to the client.

The inventive system allows for optimization parameters to be dynamically defined during content retrieval and delivery, which improves speed, particularly in a secure Internet transaction.

The inventive system allows out-of-band communication between all of the actors in the system, including the client, the proxy server, the content provider, and the transcoding process. This communication allows the delivery of the content to be dynamically tuned to fit the needs of any of the actors in the system.

In one embodiment of the invention, scripting languages, such as Python and Bash are used to combine existing programs to achieve the desired result. In another embodiment of the invention, specialized hardware is utilized where digital signal processing (DSP) chips are combined with general purpose central processing units (CPUs) providing a network-based device which achieves the desired result.

An illustrative pseudo-code implementation of a dynamically transcoding server and client connection is shown below in Table I.

TABLE I

```
define-server transcoding-proxy
    accepts inputs
        stream socket as content-stream
        stream socket as output-stream
        datagram socket as command-input
    end
    when input available on content-stream
```

TABLE I-continued

```
        start process "transcode" as transcoding
            with input from content-stream
            with output to file as transcoded-content
            with controller input named-pipe as command
        end
        while transcoding or not at eof of transcoded-content
            when input available on command-input
                send command-input to command
            end
            when output-stream is ready
                send transcoded-content to output-stream
            end
        end
    end
end
define-server content-viewer
    accepts inputs
        command-line text as url
        stream line socket as command-input
        stream socket as controller
    end
    http request url from transcoding-proxy as content-stream
    when input available on content-stream
        connect transcoding-proxy to controller
        while reading content-stream into buffer
            when input available on command-input
                send command-input to controller
            end
            display buffer on output screen
        end
    end
end
on host "transcoding.vwc.com" start server transcoding-proxy
on host "localhost" start server content-viewer
"http://videofarm.vwc.com/video/large.avi"
sleep 2
tell content-viewer:command-input "lighten shadows"
sleep 2
tell content-viewer:command-input "dither black-and-white"
```

The present invention may be used in any computer system in which complex, compound data requests are made by a client to the Internet. In particular, it is useful in the context of Internet transactions in which out-of-band client input, such as network health, location information, and authentication information is useful or necessary to ensure continued delivery of rich Internet content without interruption.

Specifically, in one example, dynamic transcoding is used in a system for secure browsing of the Internet. Since content exists which contains viruses, malware, and other unwanted data, a filtering service utilizes the dynamic transcoding as described in the inventive system to strip out bad data and to filter out unwanted content, such as pornographic scenes or images.

The various methods described above may be embodied in, and fully automated by, software code modules executed by one or more general purpose computers. The code modules may be stored in any type of computer storage device or devices (hard disk storage, solid state RAM, and the like). The steps may be implemented using any type of computer storage device or devices, and using any type or types of data repositories (relational databases, flat files, caches, and the like) to store any data.

As will be appreciated, various combinations of the features and methods described herein may be incorporated into a give system according to the invention. Accordingly, all combinations of the disclosed features and methods fall within the scope of this disclosure.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

We claim:

1. A method for processing coded content from a content server for transmission to a client in response to a request for the coded content from the client by way of a proxy server, comprising the steps of:
   A. receiving said coded content from said content server at a transcoding processor,
   B. at said transcoding processor, transcoding said coded content to transcoded content in accordance with a transcoding process,
   C. transmitting said transcoded content to said client, and
   D. during at least one of said steps A, B, and C, dynamically changing said transcoding process in response to a control signal from the proxy server, whereby the transcoding process is dynamically changed without the intervention of the client or the content server,
   wherein said control signal is applied to the transcoding processor by way of an out-of band channel.

2. A method according to claim 1 wherein said control signal is dependent on said coded content.

3. A system for processing coded content from a content server for transmission to a client in response to a request for the coded content from the client, comprising:
   A. a proxy server; and
   B. a transcoder,
   wherein the proxy server is adapted for receiving a content request from a client, wherein the content request defines coded content to be delivered to the client from a content server,
   wherein the coded content defined by the content request is encoded in accordance with a first coding scheme,
   wherein the proxy server is responsive to the content request to retrieve the coded content defined by the content request from the content server and
   wherein the transcoder is responsive to the retrieved coded content defined by the content request, to:
      (i) transcode the retrieved coded content defined by the content request to a transcoded content, in accordance with a transcoding process, whereby the retrieved coded content defined by the content request is transcoded in accordance with a second coding scheme, and
      (ii) transmit the transcoded content to the client, and
   wherein the transcoding process is dynamically defined during at least one of
      the retrieval of the coded content defined by the content request from the content server,
      the transcoding of the retrieved coded content defined by the content request, and
      the transmission of the transcoded content to the client,
   in response to an applied out-of-band transcoding process control signal from the proxy server, whereby the transcoding process is dynamically changed without the intervention of the client or the content server.

4. A system according to claim 3 wherein the proxy server is adapted to generate the out-of-band transcoding process control signal.

5. A system according to claim 4 wherein the out-of-band transcoding process control signal is generated in response to communication parameters associated with signal paths between two or more of the client, proxy server and content server.

6. A system according to claim 4 wherein the out-of-band transcoding process control signal is generated in response to detected content of the requested content.

7. A system according to claim 3 wherein the proxy server is adapted to generate the out-of-band transcoding process control signal.

8. A system according to claim 7 wherein the out-of-band transcoding process control signal is generated in response to communication parameters associated with signal paths between two or more of the client, proxy server and content server.

9. A system according to claim 7 wherein the out-of-band transcoding process control signal is generated in response to detected content of the requested content.

* * * * *